United States Patent
Roztocki et al.

(10) Patent No.: US 10,578,421 B2
(45) Date of Patent: Mar. 3, 2020

(54) SYSTEM AND METHOD FOR PHASE-READOUT AND ACTIVE STABILIZATION OF OPTICAL INTERFEROMETERS

(71) Applicant: INSTITUT NATIONAL DE LA RECHERCHE SCIENTIFIQUE, Québec (CA)

(72) Inventors: Piotr Roztocki, Montreal (CA); Christian Reimer, Longueuil (CA); Michael Kues, Montreal (CA); Robin Helsten, Montreal (CA); Yoann Jestin, Montreal (CA); Roberto Morandotti, Montreal (CA)

(73) Assignee: INSTITUT NATIONAL DE LA RECHERCHE SCIENTIFIQUE (CA)

( * ) Notice: Subject to any disclaimer, the term of this patent is extended or adjusted under 35 U.S.C. 154(b) by 0 days.

(21) Appl. No.: 15/735,430

(22) PCT Filed: Sep. 8, 2016

(86) PCT No.: PCT/CA2016/051060
§ 371 (c)(1),
(2) Date: Dec. 11, 2017

(87) PCT Pub. No.: WO2017/041174
PCT Pub. Date: Mar. 16, 2017

(65) Prior Publication Data
US 2018/0180401 A1 Jun. 28, 2018

Related U.S. Application Data

(60) Provisional application No. 62/215,437, filed on Sep. 8, 2015.

(51) Int. Cl.
*G01B 9/02* (2006.01)
*G01J 3/45* (2006.01)
(Continued)

(52) U.S. Cl.
CPC ..... *G01B 9/02067* (2013.01); *G01B 9/02003* (2013.01); *G01B 9/02027* (2013.01);
(Continued)

(58) Field of Classification Search
CPC ............ G01B 9/02003; G01B 9/02027; G01B 9/02067; G01B 2290/45; G01B 2290/70;
(Continued)

(56) References Cited

U.S. PATENT DOCUMENTS

| | | | | |
|---|---|---|---|---|
| 4,444,501 A | * | 4/1984 | Schwiesow | ........ G01B 9/02002 356/452 |
| 5,784,161 A | * | 7/1998 | Bechstein | ................. G01J 9/04 356/487 |

(Continued)

FOREIGN PATENT DOCUMENTS

| | | |
|---|---|---|
| CA | 2469817 A1 | 6/2003 |
| WO | 2009135447 A2 | 11/2009 |

OTHER PUBLICATIONS

Chou, Chien et al. "Optical activity measurement by use of a balanced detector optical heterodyne interferometer". Applied Optics. vol. 45, No. 16, Jun. 1, 2006, pp. 3733-3739. (Year: 2006).*

(Continued)

*Primary Examiner* — Michael A Lyons
(74) *Attorney, Agent, or Firm* — Lavery, de Billy, LLP; Hugh Mansfield

(57) ABSTRACT

A system and method for phase-readout/control and active stabilization on arbitrary interferometric phase in the optical interferometer platform is disclosed. The method makes use of a bi-colored polarization-multiplexed reference laser scheme. The disclosed scheme is based on two phase-locked reference signals with different frequencies that together remove the phase ambiguity. The two signals are polarization-multiplexed (either in free-space or optical fiber imple- (Continued)

mentations) to enable easy separation and combining of these two signals through the use of polarization beamsplitters. The disclosed scheme provides a one-to-one map between phase and feedback signal levels, and enables phase-readout and stabilization even when one of the feedback-signals is at a maximum/minimum.

22 Claims, 2 Drawing Sheets

(51) Int. Cl.
  G01J 9/02        (2006.01)
  G01K 11/00       (2006.01)
  G01H 9/00        (2006.01)
(52) U.S. Cl.
  CPC . *G01J 3/45* (2013.01); *G01J 9/02* (2013.01); *G01K 11/00* (2013.01); *G01B 2290/45* (2013.01); *G01B 2290/70* (2013.01); *G01H 9/004* (2013.01); *G01J 2009/0226* (2013.01)
(58) Field of Classification Search
  CPC ... G01B 9/02007; G01B 9/02062; G01J 9/02; G01J 2009/0226; G01J 2009/0284
  See application file for complete search history.

(56) References Cited

U.S. PATENT DOCUMENTS

| | | | |
|---|---|---|---|
| 6,175,320 B1* | 1/2001 | Heflinger | G02F 7/00 341/131 |
| 6,870,629 B1 | 3/2005 | Vogel et al. | |
| 7,362,445 B2 | 4/2008 | Law et al. | |
| 2004/0227943 A1 | 11/2004 | Law et al. | |
| 2005/0105097 A1* | 5/2005 | Fang-Yen | G01B 9/02072 356/497 |
| 2017/0038192 A1* | 2/2017 | Chen | G01B 9/02 |

OTHER PUBLICATIONS

Chow, Chien et al. "Differential phase decoder in a polarized optical heterodyne interferometer". J. Opt. Soc. Am. A, vol. 25, No. 11, Nov. 2008, pp. 2630-2635. (Year: 2008).*
Cho et al., Stabilization of a long-armed fiber-optic single-photon interferometer, Optic express 17, No. 21 (2009): 19027-19032.
Freschi et al., Adjustable phase control in stabilized interferometry, Optics Letters 20, No. 6 (1995): 635-637.
Goldenberg et al., Quantum cryptography based on orthogonal states, Physical Review Letters 75, No. 7 (1995): 1239.
Grassini et al., Active stabilization of a Michelson interferometer at an arbitrary phase with subnanometer resolution, Opt. Lett. 39(8), 2530-2533 (2014).
Huang et al., Optical coherence tomography, Science 254, No. 5035 (1991): 1178-1181.
Koashi et al., Quantum cryptography based on split transmission of one-bit information in two steps, Physical review letters 79, No. 12 (1997): 2383.
Marcikic et al., Distribution of time-bin entangled qubits over 50 km of optical fiber, Phys. Rev. Lett. 93(18), 180502 (2004).
Noh et al., Counterfactual quantum cryptography, Physical review letters 103, No. 23 (2009): 230501.
Rogers et al., High visibility time-energy entangled photons from a silicon nanophotonic chip, ACS Photonics 2016, 3, 1754-1761.
Toliver et al., Continoursly active interferometer stabilization and control for time-bin entanglement distribution, Optics Express 23, No. 4 (2015): 4135-4143.

* cited by examiner

SYSTEM AND METHOD FOR PHASE-READOUT AND ACTIVE STABILIZATION OF OPTICAL INTERFEROMETERS

CROSS-REFERENCE TO RELATED APPLICATIONS

This application is a National Entry Application of PCT application no PCT/CA2016/051060 filed on Sep. 8, 2016 and published in English under PCT Article 21(2), which itself claims benefit of U.S. provisional application Ser. No. 62/215,437, filed on Sep. 8, 2015. All documents above are incorporated herein in their entirety by reference.

FIELD OF THE INVENTION

The present invention relates to a system and method for phase-readout/control in the optical interferometer platform as well as a system and method for active stabilization at an arbitrary interferometric phase of fiber-based and free-space interferometers. The method and system makes use of a bi-colored polarization-multiplexed reference laser scheme

BACKGROUND

Interferometry is central to research and industrial applications such as high-precision metrology (Cho S.-B., and Noh T.-G. "*Stabilization of a long-armed fiber-optic single-photon interferometer.*" Optics express 17, no. 21 (2009): 19027-19032, incorporated herein by reference in its entirety, hereinafter Cho), optical coherence tomography (Huang D., Swanson E. A., Lin C. P., Schuman J. S., Stinson W. G., Chang W., Hee M. R., Flotte T., Gregory K., and Puliafito C. A. "*Optical coherence tomography.*" Science 254, no. 5035 (1991): 1178-1181, incorporated herein by reference in its entirety, hereinafter Huang), and quantum optics experiments (Marcikic, Toliver P., Dailey J. M., Agarwal A., and Peters N. A. "*Continuously active interferometer stabilization and control for time-bin entanglement distribution.*" Optics Express 23, no. 4 (2015): 4135-4143, incorporated herein by reference in its entirety, hereinafter Toliver), and is critical for certain quantum communications/key distribution protocols (Goldenberg L., and Vaidman L. "*Quantum cryptography based on orthogonal states.*" Physical Review Letters 75, no. 7 (1995): 1239, incorporated herein by reference in its entirety, hereinafter Goldenberg; Koashi M., and Imoto N. "*Quantum cryptography based on split transmission of one-bit information in two steps.*" Physical review letters 79, no. 12 (1997): 2383, incorporated herein by reference in its entirety, hereinafter Koashi; Noh T.-G. "*Counterfactual quantum cryptography.*" Physical review letters 103, no. 23 (2009): 230501, incorporated herein by reference in its entirety, hereinafter Noh). Fiber-based interferometry specifically is a robust and scalable platform for these applications, due to the availability, low cost, and ease of use of components. However, various environmental factors such as thermal, acoustic, and mechanical perturbations change the optical path difference between interferometer arms and cause drifts and random fluctuations in interferometer phase. The large uncertainty in the phase reduces control over how precisely a signal can be interfered by the interferometer, introducing measurement uncertainties. In order to guarantee precise measurements and long-term phase stability, phase stabilization techniques are employed.

Optical interferometer stabilization methods include passive methods, which usually attempt to minimize the impact or amount of environmental fluctuation (e.g. through temperature control or isolation from vibration), and active stabilization methods, which use real-time control to rectify instabilities. However, as the impact of environmental factors is only reduced (and not eliminated) with passive stabilization methods, these are insufficient on their own for long-term operational stability and they must usually be combined with active stabilization techniques.

Recently, interest in active stabilization methods for the fiber-optic interferometer platform has been driven by applications such as quantum communications and experimental realizations of quantum key distribution protocols, quantum optics experiments (Cho), and the generation of special non-classical states of light (such as time-bin entangled qubits) for quantum information processing applications (Toliver).

Optical coherence tomography (OCT) and other interferometric sensing approaches are non-invasive measurement techniques that can be used to extract depth or material information using the known optical phase of an interferometer. Increasing their measurement resolution, or equivalently, the precision of the optical phase readout, is therefore highly relevant for these applications.

Interferometer phase-readout and active stabilization methods to date have largely been limited to the use of a small phase modulation (dither) in an interferometer arm (Freschi A. A., and Frejlich J. "*Adjustable phase control in stabilized interferometry.*" Optics Letters 20, no. 6 (1995): 635-637, incorporated herein by reference in its entirety, hereinafter Freschi), the injection of an additional laser reference signal into the interferometer (Cho and Marcikic I., de Riedmatten H., Tittel W., Zbinden H., Legré M., and Gisin N., "*Distribution of time-bin entangled qubits over 50 km of optical fiber.*" Phys. Rev. Lett. 93(18), 180502 (2004), incorporated herein by reference in its entirety, hereinafter Marcikic), and variants of the Pound-Drever-Hall laser frequency stabilization scheme (Rogers S., Mulkey D., Lu X., Jiang W. C., Lin Q., "High visibility time-energy entangled photons from a silicon nanophotonic chip." (2016): arXiv:1605.06540, incorporated herein by reference in its entirety, hereinafter Rogers).

Existing stabilization methods (e.g. reference lasers) and many interferometric sensing approaches that make use of feedback/phase-readout signals periodic in phase (like interference fringes) cope with intrinsic phase-readout ambiguities. Specifically, a single readout-signal level usually corresponds to more than one unique phase; the readout-signal is not a one-to-one function of the phase. Additionally, the phase at readout-signal maxima/minima is difficult to precisely define as these points have a low phase derivative; a large change in phase corresponds to only a small change in the readout signal. Phase readout and stabilization schemes that address these issues do so at the expense of reduced precision in phase control or a greatly increased setup complexity/cost. For example, dithering adds an additional noise source that degrades output quality in applications such as quantum optics (Grassani D., Galli M., and Bajoni D. "Active stabilization of a Michelson interferometer at an arbitrary phase with subnanometer resolution." Opt. Lett. 39(8), 2530-2533 (2014), incorporated herein by reference in its entirety, hereinafter Grassani), while variants of the Pound-Drever-Hall method greatly increase setup complexity (Rogers).

Many stabilization methods for free-space interferometer setups allow precise phase-readout and arbitrary-phase stabilization (Grassani), but are either too complex, costly, or simply not transferable to fiber-optic interferometers (which have issues unique to the fiber platform, such as birefringence shifts in the interferometer arms).

Therefore, despite the development of phase-readout methods in optical interferometers as well as active stabilization schemes, these methods and systems are usually limited to one particular implementation and especially for fiber interferometers, several phase-readout issues still need to be addressed. For interferometric sensing and interferometer stabilization applications, the following issues are not yet solved in all platforms: (i) intrinsic phase ambiguities due to the periodicity of feedback signals (Grassani); (ii) phase ambiguity at feedback signal extrema (it is difficult to accurately stabilize on maxima/minima due to the low signal derivative and potential sign-change of the feedback signal). As the precision of phase-readout determines the precision of measurement, phase-stabilization and control, there exists a need for state-of-the-art systems and methods for phase readout/control and active stabilization particularly compatible with fiber-based interferometers.

SUMMARY OF THE INVENTION

In order to address the above and other drawbacks, there is provided a system and method for phase-readout/control and active stabilization on arbitrary interferometric phase in the optical interferometer platform. The previous limitations are overcome by introducing a new method that makes use of a bi-colored polarization-multiplexed reference laser scheme. The disclosed scheme is based on two phase-locked reference signals with different frequencies that together remove the phase ambiguity. The two signals are polarization-multiplexed (either in free-space implementations, or using polarization-maintaining optical fibers) to enable easy separation and combining of these two signals through the use of polarization beam-splitters. The disclosed scheme provides a unique, one-to-one map between phase and feedback signal levels, and enables straightforward phase-readout and stabilization even when one of the feedback-signals is at a maximum/minimum.

In particular, the method comprises a light source with a linearly-polarized output which is then split into a first beam and a second beam using a beam-splitter. The first beam is then frequency-shifted (e.g. by using an acousto-optic modulator (AOM) device). The polarization of one of the two beams is then rotated 90 degrees and both beams are combined using a polarizing beam-splitter. The combined beams are then injected into an interferometer or sensing setup. After passing through the interferometer a polarizing beam-splitter separates the cross-polarized beams and feeds them to two respective photodiodes. By detecting the powers (or temporal profiles or spectrums) of these first and second interfered beams (which correspond to interference at two different colors), the interferometer phase can be precisely determined (provided the other system parameters, such as the frequency shift magnitude, have been characterized and held constant). In the fiber-based implementation, a polarization-maintaining fiber is used, where the polarization beam-splitter places the two different inputs on the fast and slow fiber axis. In a Mach-Zehnder interferometer, the signal can be extracted at one or both of the interferometer output ports. In a Michelson Interferometer, the signal can be measured at the interferometer output, or the input port, if a polarization-maintaining (PM) circulator is used. Single-mode non-polarization maintaining fibers can also be implemented, using for example a Michelson interferometer with Faraday-mirrors. From the measured signals, the interferometer phase can be extracted for sensing applications, or the interferometer phase can then be stabilized, for example by using this phase-readout and a feedback loop to an adjustable arm of the interferometer (that corrects for drifts).

DETAILED DESCRIPTION OF THE ILLUSTRATIVE EMBODIMENTS

Figure 1:
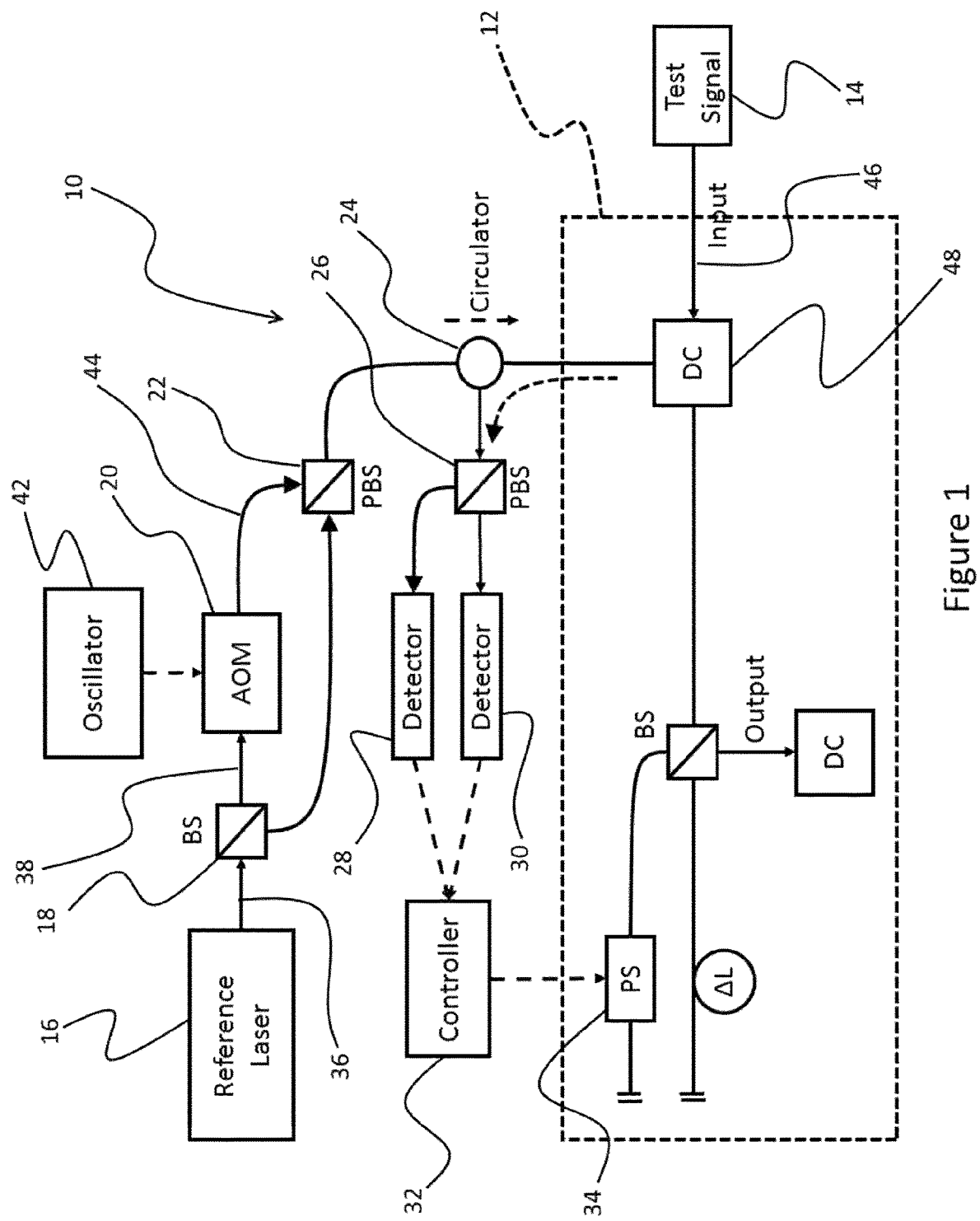
FIG. 1 provides a schematic diagram of a system for active stabilization at an arbitrary phase of fiber-based interferometers in accordance with an illustrative embodiment of the present invention.

Referring now to FIG. 1, a system for stabilization at an arbitrary phase of fiber-based interferometers generally referred to using the reference numeral 10, and in accordance with an illustrative embodiment of the present invention, will now be described. The system 10 is used to first extract the exact phase, and then perform phase-stabilization of interferometer 12, illustratively an unbalanced Michelson interferometer, being used analyze a test signal 14 being input to the interferometer 12.

The system 10 comprises a light source 16, beam splitter 18, a frequency shifter 20, a first polarizing beam-splitter 22, a PM optical circulator 24, a second beam splitter 26, a first photodetector 28, a second photodetector 30 and a controller 32 which controls an adjustable phase arm 34 of interferometer 12.

In operation, the light source 16 generates a stabilized single-frequency linearly-polarized output 36 which is divided into a first signal 38 and a second signal 40 using the beam splitter 18. The first signal 38 is fed into the frequency shifter 20, for example an acousto-optic modulator (AOM), which comprises a frequency-reference/oscillator 42. The second signal is recombined with the frequency-shifted first signal 44 on orthogonal polarizations using the first polarizing beam-splitter 22 and polarization-maintaining (PM) fibers. Both beams pass via the PM circulator 24 and enter the interferometer 12, which in this case is an unbalanced Michelson interferometer.

After exiting the interferometer 12, both beams are again separated by the second polarizing beam-splitter 26 and each detected using one of the respective two photodetectors 28, 30. In the particular implementation shown in FIG. 1, the signal is detected after reflection from the interferometer 12, passing through the circulator 24 which separates the input and output reference signals. In this manner, the reference laser light source 16 is used to read-out the interferometer phase, which can be used for active stabilization, and a test beam 46 of a different color can be injected into the interferometer 12 via a dichroic coupler (DC) 48 and be filtered out following interference.

In the illustrative embodiment an unbalanced Michelson interferometer was used composed of a standard 2×2 fiber coupler and two Faraday mirrors. In one arm, additional fiber was added to generate an arm imbalance $\Delta L$ while a piezo fiber-stretcher was used in one arm as a controllable phase shifter (PS).

Figure 2:
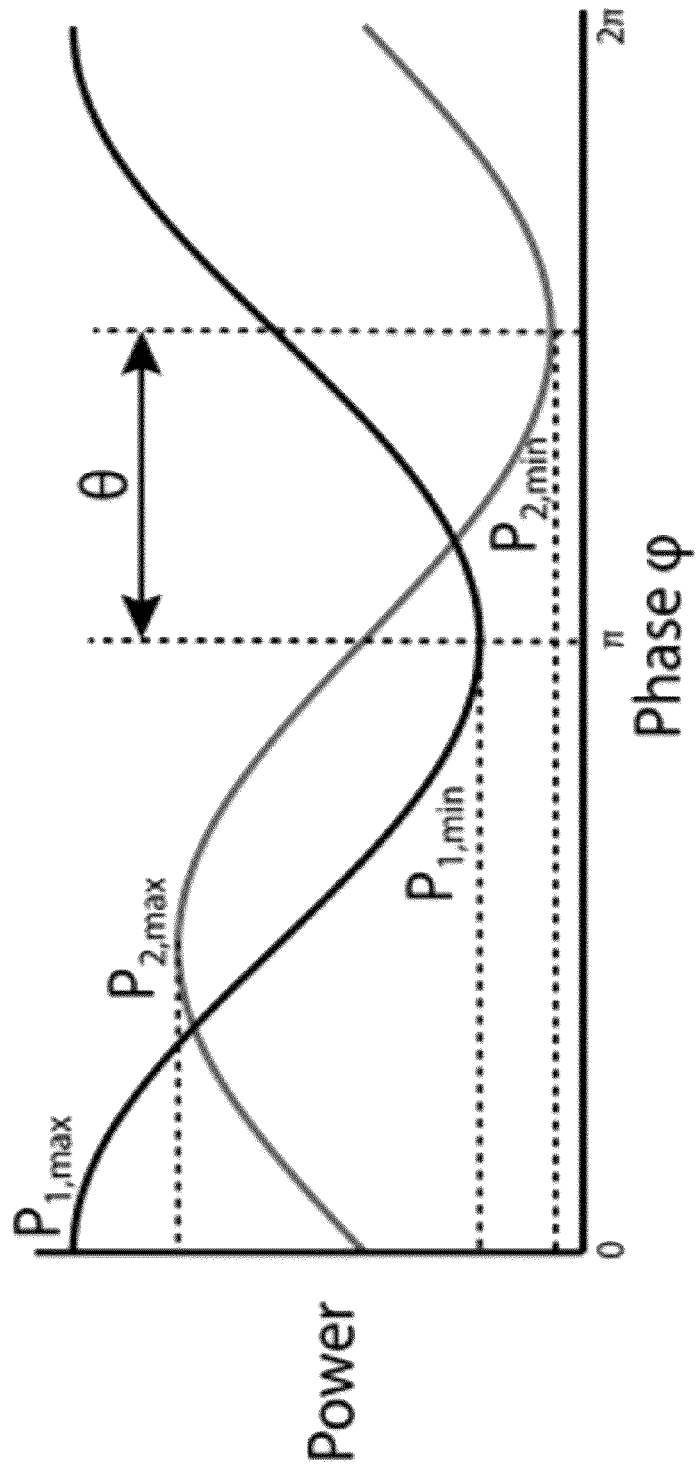
FIG. 2 provides a graph of detector outputs as a function of interferometer phase in accordance with an illustrative embodiment of the present invention.

Still referring to FIG. 1, the photodetectors measure the power of their respective beams/signals. This power is a function of the interferometer phase φ at the first detector 28 (P$_1$) and the second detector 30 (P$_2$) as shown in FIG. 2 and given by:

$$P_1 = P_{1,min} + \frac{P_{1,max}}{2}(1 + \cos(\varphi)) \quad (1)$$

$$P_2 = P_{2,min} + \frac{P_{2,max}}{2}(1 + \cos(\varphi - \theta)), \text{ for } 0 \le \varphi \le 2\pi \quad (2)$$

P$_{1,max}$ and P$_{2,max}$ are the maximum powers for the two photodiodes respectively (which depend on the light source output power, beam splitter ratios, respective losses for the two beams, etc.). θ is the phase difference between the signals 1 and 2, determined by the frequency shift induced by frequency shifter 20. P$_{1,min}$ and P$_{2,min}$ are the minimum powers for the two photodiodes respectively, and account for an imperfect beam-splitting ratio, unequal losses through the two arms, and other interferometer imperfections. The functions described in (1) and (2) are not restricted to the particular described implementation, but the same expression can be achieved for an unbalanced fiber-based or free-space interferometer with the above-described polarization-multiplexed input.

As P$_{1,max}$, P$_{2,max}$, P$_{1,min}$, P$_{2,min}$, and θ can be determined by observing one full sweep of φ from 0 to 2π (e.g. by shifting the phase shifter PS in one interferometer arm), and they can be controlled to remain constant throughout the course of interferometer operation, the measurement of P$_1$ and P$_2$ suffices to precisely determine the interferometer phase φ by using equations (1) and (2).

As the frequency of the frequency shifter 20 (e.g. AOM) can be adjusted, it becomes possible to tune the frequency to achieve an optimal operating condition (e.g. θ=nπ, where n is an integer, corresponds to the least optimal operating conditions). In particular, a Θ=π/2 phase shift (where the low-derivative portions of one signal correspond with high-derivative areas of the other) can be obtained using a frequency shift Δf$_{\pi/2}$ equal to:

$$\Delta f_{\pi/2} = \frac{c}{4n_g \Delta L} \quad (3)$$

Where n$_g$ is the group index of the fiber and c the vacuum speed of light, and ΔL is the length difference between the interferometer arms. Illustratively the frequency shifter 20 comprises a standard AOM optimized for 200 MHz, suitable for use with an unbalanced Michelson interferometers and a path length difference of larger than 25 cm. For more balanced interferometers (smaller ΔL) typically a faster AOM is required, or different methods of frequency shifting such as electronic modulation or nonlinear optical interactions may be employed.

The above-stated precise method of phase-readout enables the stabilization of the interferometer on any arbitrary phase. In particular, a controller 32 calculates the actual interferometer phase from the two photodetector signals, compares it to the desired phase, and outputs a rectifying control signal to the interferometer phase shifter to change the current phase towards the desired value. This rectifying control signal can be determined by a control algorithm such as a Proportional-Integral-Derivative (PID) algorithm.

The disclosed system 10 may applied with various interferometer types such as the Michelson and Mach-Zehnder configurations, or for interferometers with more ports. Indeed, the system 10 may be used for the stabilization of unbalanced interferometers as in the scheme presented in FIG. 1, and can also be adapted to stabilize balanced interferometers by using polarization-multiplexed bi-colour beams to ensure the same amount of interference occurs at both wavelengths (the case when arm optical paths are equal).

The disclosed system 10 may be applied with various interferometer types such as interferometers with more than 2 arms. For interferometers with n-arms, where n is an integer greater than 2, the interference fringe pattern differs from that described by FIG. 2 and equations (1) and (2) (for one, the interference depends on n−1 interferometer arm phases). However, in this case the injection of a bi-colored polarization-multiplexed beam into one or several of the arms still yields more phase-readout information than a single reference beam, and can be used to aid phase-readout and phase-stabilization, even if the response ceases to be a one-to-one map with the n−1 phases.

The disclosed system may be used with reference lasers of the continuous wave (CW) and pulsed output type. The system 10 may also be used with frequency shifting using an acousto-optic modulator (AOM) and electric oscillator signal, using two independent yet coherent light sources of different colors, using selective filtering of a broadband laser output, or other frequency shifting means such as an electro-optic modulator or use of other nonlinear optical effects, as long as the bi-color beams are polarization-multiplexed and coherent with one another.

The light source prerequisites include a coherence length longer than the interferometer arm length difference, phase stability, and a phase relation for bi-colour beam sources. The system 10 may also be used without standard polarization-maintaining fibres and with other means of polarization control. The system 10 may also be used for precise phase determination even without it being actively stabilized, i.e. for environmental sensing applications. Furthermore, the system 10 may be used with a variety of input light sources such as diode, gas, and solid state lasers, as well as lasers that can produce bi-color beams such as simple NdYAG frequency doubled green lasers (that produce a frequency and its harmonic) which would then replace the portion of the scheme dedicated to creating two-colour beams.

The disclosed system and polarization-multiplexing approach can be implemented with single frequency or broadband light for applications in Fourier-transform spectroscopy, OCT or other sensing applications.

The system 10 may be used with detectors with both linear and nonlinear power responses. The system 10 may be used with detectors of the photodiode type, as well as other optoelectronic photosensors such as photoresistors, photovoltaics, and single-photon detectors, as well as detectors with high temporal and frequency resolution.

The system 10 may use stabilization algorithms other than the discussed PID algorithm, such as just the PI or P algorithms. The system 10 may be used for any kind of feedback/rectifying signal from the controller, whether it is the interferometer phase shift, signal laser frequency shift, active temperature shifts, or others. The system 10 may be used without Faraday mirrors in the interferometer, but other polarization control methods. The system 10 may be used with feedback via analog electronic circuit, microcontroller, FPGA, or other controllers.

The system 10 may be used with or without Faraday mirrors in the interferometer, or with other polarization control methods. The system 10 may be used for a test beam of a single other color or many other colors, in which case the dichroic coupler would be replaced with a fitting frequency filter for the application (as in the case of white light interferometry as used in optical coherence tomography).

The disclosed approach solves the following issues outlined above:

The system/method removes the ambiguity in phase readout that arises from measured signals not being one-to-one functions of the interferometer phase, by using a bi-color reference signal creating responses that uniquely correspond to interferometer phases.

The system/method allows phase stabilization on arbitrary phase.

The system and method introduce a novel approach to active stabilization of free-space and fiber-optic interferometers. The system and method enable adjustment of the interferometer to an arbitrary phase and long-term stabilization using active feedback. The system and method are a first use of polarization multiplexing of a bi-colour signal for the purpose of interferometer stabilization. The stabilization scheme is scalable as only one source of orthogonal bi-coloured beams is needed for potentially multiple and/or cascaded interferometers, enabling a robust platform. This is required for example for quantum state tomography and characterization as well as quantum communications setups. The system and method also benefit from all the advantages of the fiber-optic platform such as compatibility with current telecommunications infrastructure, low cost, and ease of use.

Although the present invention has been described hereinabove by way of specific embodiments thereof, it can be modified, without departing from the spirit and nature of the subject invention as defined in the claims.

We claim:

1. A method for phase readout control and active stabilization of an interferometer comprising:
   feeding a pair of polarization orthogonal, coherent beams of light of different colors into an interferometer;
   splitting an output of said interferometer using a polarizing beam-splitter, said output comprising a first interfered beam combined with a second interfered beam;
   detecting one of a power, temporal profile or spectrum of said first interfered beam with a first optical detector and one of a power, temporal profile or spectrum of a second interfered beam with a second optical detector; and
   determining an interferometer phase as a function of said first interfered beam measured output and said second interfered beam measured output.

2. The method of claim 1, wherein said pair of polarization orthogonal, coherent beams of light of different colors are provided by:
   splitting an output of a light source having a stabilized single-frequency and linearly-polarized output into a first beam and a second beam using a beam-splitter;
   frequency-shifting said first beam with a known frequency shift in a controllable manner; and
   combining said frequency-shifted first beam with said second beam using a polarizing beam-splitter.

3. The method of claim 2, wherein the frequency shift is provided by one of an acousto-optic modulator, an electro-optic modulator, or nonlinear optical effects.

4. The method of claim 1, wherein a source of said polarization-orthogonal, coherent two-color beams is comprised of one of a selective filtering and polarization-turning of a single broadband laser output, two separate phase-locked differently-colored lasers, or a laser source that produces bi-color beams.

5. The method of claim 4, wherein said laser source that produces bi-color beams comprises a laser with subsequent nonlinear second harmonic or difference frequency generation.

6. The method of claim 4, wherein said laser source that produces polarization-orthogonal, bi-color beams comprises a laser with subsequent second harmonic or difference frequency generation.

7. The method of claim 1, wherein a source of said polarization-orthogonal, coherent two-color beams is one of continuous-wave (CW) or pulsed.

8. The method of claim 1, wherein said determined interferometer phase is rectified to match an arbitrary target phase by shifting a controllable interferometer arm.

9. The method of claim 1, wherein said interferometer is one of balanced or unbalanced.

10. The method of claim 1, wherein said interferometer comprises two or more arms.

11. The method of claim 1, wherein said interferometer is one of a free-space interferometer or a fiber-based interferometer.

12. A system for phase readout control and active stabilization of an interferometer comprising:
   a source of a pair of polarization orthogonal, coherent beams of light of different colors;
   an interferometer into which said pair of beams of light are fed;
   a polarizing beam-splitter for splitting an output of said interferometer, said output comprising a first interfered beam combined with a second interfered beam;
   a first optical detector for measuring one of a power, temporal profile or spectrum of said first interfered beam; and
   a second optical detector for measuring one of a power, temporal profile or spectrum of a second interfered beam;
   wherein an interferometer phase is determined as a function of said first interfered beam measured output and said second interfered beam measured output.

13. The system of claim 12, wherein said source of a pair of polarization orthogonal, coherent beams of light of different colors comprises
   a light source having a stabilized single-frequency and linearly-polarized output,
   wherein an output of said light source is split into a first beam and a second beam using a beam-splitter,
   said first beam is frequency-shifted with a known frequency shift in a controllable manner, and said frequency-shifted first beam is combined with said second beam using a polarizing beam-splitter.

14. The system of claim 13, wherein said first beam is frequency shifted by one of an acousto-optic modulator, an electro-optic modulator or nonlinear optical effects.

15. The system of claim 12, wherein said source of polarization-orthogonal, coherent two-color beams is comprised of one of a selective filtering and polarization-turning of a single broadband laser output, two separate phase-locked differently-colored lasers, or a laser source that produces bi-color beams.

16. The system of claim 15, wherein said laser source that produces bi-color beams comprises a laser with subsequent nonlinear second harmonic or difference frequency generation.

17. The system of claim 15, wherein said laser source that produces polarization-orthogonal, bi-color beams comprises a laser with subsequent second harmonic or difference frequency generation.

18. The system of claim 12, wherein said source of polarization-orthogonal, coherent two-color beams is one of continuous-wave (CW) or pulsed.

19. The system of claim 12, wherein said determined interferometer phase is rectified to match an arbitrary target phase by shifting a controllable interferometer arm.

20. The system of claim 12, wherein said interferometer is one of balanced or unbalanced.

21. The system of claim 12, wherein said interferometer comprises two or more arms.

22. The system of claim 12, wherein said interferometer is one of a free-space interferometer or a fiber-based interferometer.

* * * * *